United States Patent
Shah et al.

(10) Patent No.: US 12,225,474 B2
(45) Date of Patent: Feb. 11, 2025

(54) UPLINK TRANSMISSION POWER ADJUSTMENT IN 5G NR COMMUNICATION NETWORKS

(71) Applicant: T-Mobile Innovations LLC, Overland Park, KS (US)

(72) Inventors: Anokhi Shah, Bellevue, WA (US); Mochamad Mirza, Bothell, WA (US)

(73) Assignee: T-Mobile Innovation LLC, Overland Park, KS (US)

( * ) Notice: Subject to any disclaimer, the term of this patent is extended or adjusted under 35 U.S.C. 154(b) by 359 days.

(21) Appl. No.: 17/680,111

(22) Filed: Feb. 24, 2022

(65) Prior Publication Data

US 2023/0269670 A1  Aug. 24, 2023

(51) Int. Cl.
*H04W 52/24* (2009.01)
*H04W 52/36* (2009.01)

(52) U.S. Cl.
CPC ....... *H04W 52/241* (2013.01); *H04W 52/367* (2013.01)

(58) Field of Classification Search
CPC ............. H04W 52/241; H04W 52/367; H04W 52/146; H04W 52/42
See application file for complete search history.

(56) References Cited

U.S. PATENT DOCUMENTS

| | | | |
|---|---|---|---|
| 2020/0154362 A1* | 5/2020 | Shi ........................ | H04L 5/0023 |
| 2021/0167914 A1* | 6/2021 | Kwak ................... | H04W 72/23 |
| 2021/0167925 A1* | 6/2021 | Qi ......................... | H04L 5/0053 |
| 2022/0150841 A1* | 5/2022 | Sun ....................... | H04L 5/0048 |
| 2023/0115798 A1* | 4/2023 | Lee ...................... | H04W 52/362 370/318 |
| 2023/0254781 A1* | 8/2023 | Sridharan ............. | H04W 52/34 455/522 |
| 2023/0269669 A1* | 8/2023 | Jin ........................ | H04W 52/24 455/522 |

FOREIGN PATENT DOCUMENTS

WO  2023079540  *  5/2023

* cited by examiner

*Primary Examiner* — Angelica Perez
(74) *Attorney, Agent, or Firm* — Shook, Hardy & Bacon L.L.P.

(57) ABSTRACT

Systems, methods, and computer-readable media herein provide for adjustment of transmit power of a user device based on transitioning from one configuration to another configuration. Transitioning a user devices to a configuration may involve modifying the number of layers and/ports used for uplink communications. In response to modifying the number of layers and/or ports, a user device may alter the transmit power used for uplink communication so that a target power can be utilized by the user device. Adjustments to the transmit power enables a higher coverage and performance of the user device in a communication network.

20 Claims, 7 Drawing Sheets

UPLINK TRANSMISSION POWER ADJUSTMENT IN 5G NR COMMUNICATION NETWORKS

BACKGROUND

Communication devices are capable of transmitting signals and data according to a transmit power value representing the power level of the transmitted signal that is radiated from the device. A communication device (e.g., user equipment or UE) may be configured to operate at one or more transmit power configurations and/or according to one or more power classes (e.g., that define the maximum or target transmit power). Generally, a UE transmitting at a higher transmit power will have a greater communication range with respect to a base station and/or receiver and may increase the uplink transmission data throughput. Consequently, a UE operating at a higher transmit power may result in an increased power usage by the UE and may negatively influence battery life and other resources of the UE.

Since UEs may be operated according to a configuration (e.g., power class) with a higher transmit power, UEs and communication networks may be configured to enable a UE to transition between configurations and/or transmit power settings. For example, when an increased communication range between a UE and base station is not necessary, the UE (e.g., mobile phone) may transition to operate at a lower transmit power to preserve battery life. A UE may transition from a particular configuration to another based on changes to signal quality measurements (e.g., SINR measurements) and/or reference signals associated with a communication network (e.g., RSRP). Transitioning from one configuration to a different configuration may involve altering the number of transmission antennae ports (e.g., Tx ports) and/or layers (e.g., layers used for multiplexing operations for the transmitted data). For example, a UE may be configured with two antennae ports and two layers that each transmit at 23 dBm, for a combined total of 26 dBm. Under certain conditions, a UE may transition from operating using two antennae ports to operating on one antennae port.

In some conventional systems, when a UE transitions from operating using two antennae ports to using one antennae port or from two layers to one layer, transmit power may be effectively reduced since the maximum transmit power was previously distributed across multiple layers and/or ports. For example, a UE transmitting at 26 dBm across two ports (e.g., transmitting at 23 dBm each) may transition to using a single port transmitting at 23 dBm and may be below the maximum power specified by the target power class. This effective drop in transmit power may result in loss of coverage of service and capacity of a cell of a communication network.

SUMMARY

The present disclosure is directed, in part, to uplink transmission power adjustment in 5G NR communication networks, substantially as shown in and/or described in connection with at least one of the figures, and as set forth more completely in the claims. In contrast to conventional approaches, based on signal quality signals and/or reference signals, a UE may transition of a reduced number of uplink transmission layers and/or antenna ports while maintaining a consistent transmit power level (also referred to as, "transmit power" or "Tx power"). For example, a UE transitioning from two layers to one layer may increase the transmit power of the one layer to compensate for the loss in transmit power of the inactive second layer. In some embodiments, the transmit power of a UE may be increased at the time that the UE is instructed to transition from one particular configuration to another. For example, the UE may be instructed to reduce the number of ports and/or layers while simultaneously boosting transmit power the reduced number of ports and/or layers. In at least one embodiment, the transmit power of a UE may be increased in response to determining that the number of uplink transmission layers and/or ports has decreased. For example, upon detecting a reduced number of active transmission layers, a UE may increase the transmit power associated with the remaining transmission layers. By preemptively, concurrently, and/or reactively adjusting the uplink transmit power of a UE, the configuration of the UE may be modified with minimal loss in service coverage, throughput, and communication network capacity.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, which are intended to be exemplary and non-limiting, wherein.

DETAILED DESCRIPTION

Figure 1:
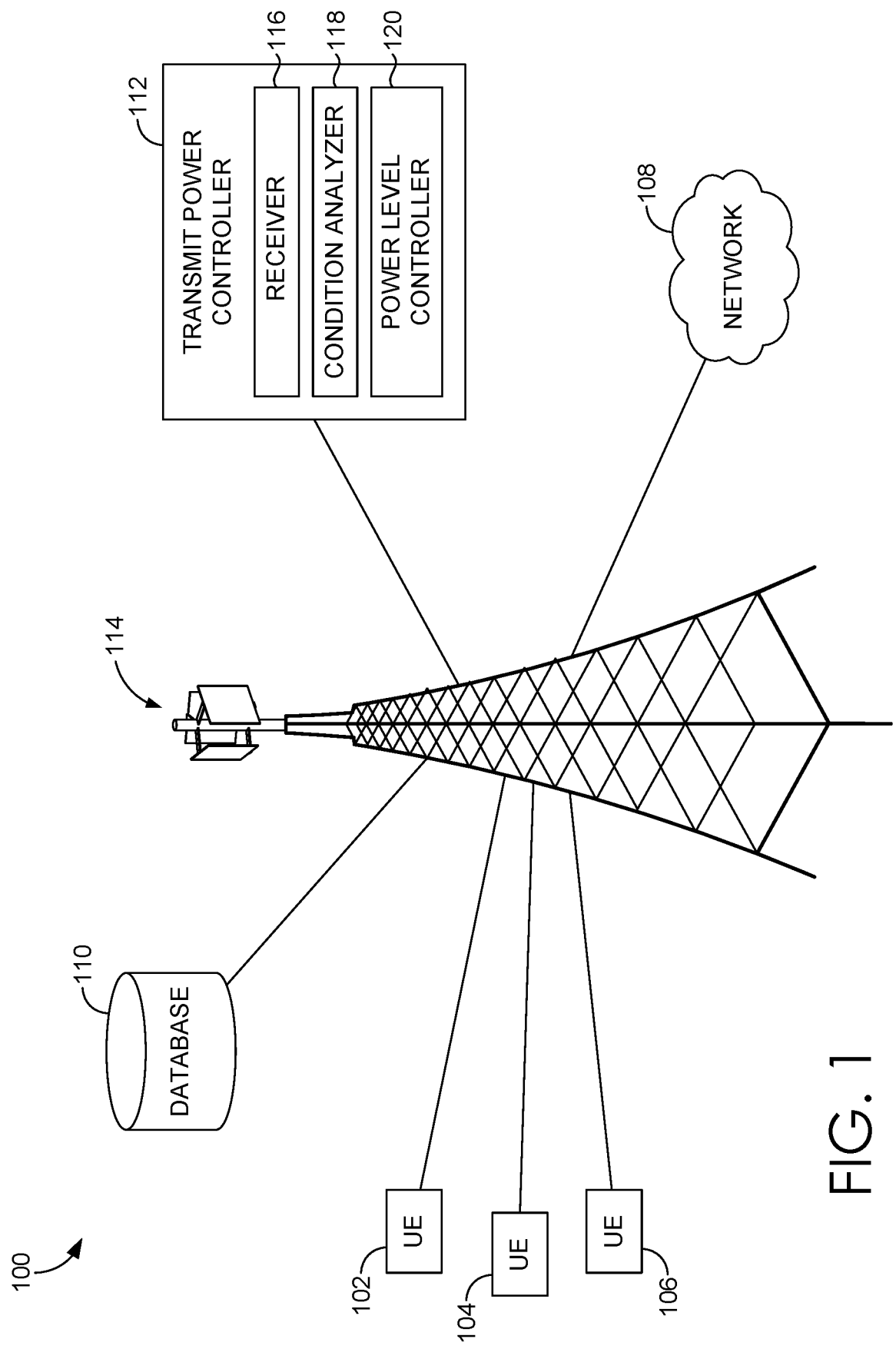
FIG. 1 depicts an exemplary network environment in which implementations of the present disclosure may be employed.

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention.

THE FOLLOWING IS A LIST OF THESE ACRONYMS

AWS Advanced Wireless Services
BRS Broadband Radio Service
BTS Base Transceiver Station
CDMA Code Division Multiple Access
CSI-RS Channel State Information Reference Signal
EBS Educational Broadband Services
eNodeB Evolved Node B
EVDO Evolution-Data Optimized
gNodeB Next Generation Node B
GPS Global Positioning System
GSM Global System for Mobile Communications
HRPD High Rate Packet Data
eHRPD Enhanced High Rate Packet Data
IoT Internet of Things
LTE Long Term Evolution
LTE-A Long Term Evolution Advanced
MIMO Multiple-Input, Multiple-Output
PCS Broadband Personal Communications Service
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
WCS Wireless Communications Service
WiMAX Worldwide Interoperability for Microwave Access Further, various technical terms are used throughout this description. A definition of such terms can be found in, for example, Newton's Telecom Dictionary by H. Newton, 31st Edition (2018). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Embodiments of the technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media includes volatile and/or non-volatile media, removable and non-removable media, and contemplate media readable by a database, a switch, and various other network devices. Network switches, routers, and related components are conventional in nature, as are means of communicating with the same. By way of example and not limitation, computer-readable media comprise computer storage media and/or communications media. Computer storage media, or machine-readable media, include media implemented in any method or technology for storing information. Examples of stored information include computer-useable instructions, data structures, program modules, and other data representations. Computer storage media include RAM, ROM, EEPROM, flash memory or other memory technology, CD-ROM, digital versatile discs (DVDs), holographic media or other optical disc storage, magnetic cassettes, magnetic tape, magnetic disc storage, and/or other magnetic storage devices. These memory components can store data momentarily, temporarily, or permanently. Computer storage media does not encompass a transitory signal, in embodiments of the present invention.

Communications media typically store computer-useable instructions, including data structures and program modules, in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

At a high level, systems, methods, and computer-readable media of the present disclosure provide for uplink transmission power adjustment in 5G NR communication networks. Although 5G NR networks are contemplated herein, it is not intended to be limiting and any other suitable communication network (e.g., 4G LTE, 6G, etc.) may be used. The systems, methods, and computer-readable media disclosed herein may provide a predictive and/or reactive adjustment of transmit power of a UE (e.g., user device) or other device. By detecting changes in signal quality and/or service mode, the effective power used to transmit uplink communications may be adjusted to maintain a target output transmit power and/or other power class parameters. Adjusting the uplink transmit power of a UE in response to changes in signal quality or service mode, allows a UE to operate with an optimal configuration for a particular scenario and/or conditions while minimizing loss in service and/or throughput.

In a first aspect of the present invention, a method is provided. The method comprises receiving signal quality information associated with a device. For example, the information may include a value indicating a signal quality for the device, such as a SINR value or RSRP value that may indicate aspects of a signal strength and/or power. The method may comprise receiving configuration information associated with the device. For example the configuration information may comprise an uplink transmission configuration such as a 1-layer uplink protocol and/or a 2-layer MIMO protocol. In some embodiments the configuration information may include a number of ports and/or layers that are used by the device for uplink transmissions. The method may include determining that the transmit power of the device is less that a threshold maximum power. For example, based on the received signal quality information and the configuration information, it may be determined that the power being used by the device to transmit is less than a maximum possible transmit power. The method may include adjusting the transmit power of the device based on determining that the transmit power of the device is less than the threshold maximum power.

In a second aspect of the present invention, a system is provided. The system comprises one or more processors and one or more computer storage hardware devices storing computer-usable instructions that, when used by the one or more processors, cause the one or more processors to receive signal quality information associated with a device. For example, the signal quality information may comprise a value such as RSRP, SINR, and/or RSRQ values that indicate a strength of a received signal. The system may cause the processors to receive configuration information comprising an uplink transmission configuration. For example, the uplink transmission configuration may include an indication of a particular mode used by the device that define the number of antennae ports and/or layers used by the device for uplink transmission. The system may cause the processors to determine, based on the signal quality information and the configuration information associated with the device, that a transmit power of the device can be adjusted. For example, the system may determine that a device operating on 1 port and 1-layer uplink operations may adjust the transmit power to 26 dBm. The system may also cause the processors to adjust the transmit power of the device based on determining that the transmit power of the device should be adjusted.

In a third aspect of the present invention, a computer-readable media is provided, the computer-readable media having computer-executable instructions embodied thereon that, when executed, perform a method for adjusting uplink transmit power in a device. In accordance with the media, the method may comprise determining that a user device operating according to a first uplink protocol should transition to a second uplink protocol. For example, it may be determined that a device that is operating on a 2-layer MIMO protocol should transition to a 1-layer protocol (e.g., a protocol using 1 antennae port and 1 layer). In some embodiments, determining that a device should transition from one protocol to another may be based on detected and/or measured RF condition. In some embodiments, the first uplink protocol may have a different number of layers or number of ports form the second uplink protocol. The method may comprise calculating a power adjustment value. For example, if a device transitions from two layers operating at a value of 23 dBm each to a single layer operating at 23 dBm, a power adjustment value may be calculated to compensate for the reduced number of layers (e.g., restoring total power to 26 dB). The method may comprise causing a modification to a transmit power of the user device based on the power adjustment value. For example if a power adjustment value of +3 dBm is calculated, a transmit power of the user device may be increased from 23 dBm to 26 dBm.

Turning now to FIG. 1, network environment 100 is an exemplary network environment in which implementations of the present disclosure may be employed. Network environment 100 is one example of a suitable network environment and is not intended to suggest any limitation as to the scope of use or functionality of the present disclosure. Neither should the network environment be interpreted as having any dependency or requirement relating to any one or combination of components illustrated.

The network environment 100 of FIG. 1 includes user devices 102, 104, and 106, a cell site 114, a network 108, a database 110, and a transmit power controller 112. In the network environment 100, the user devices 102, 104, and 106 may take on a variety of form, such as a PC, a user device, a smart phone, a smart watch, an IoT device, a laptop computer, a mobile phone, a mobile device, a tablet computer, a gaming device, a wearable computer, a PDA, a server, a CD player, an MP3 player, GPS device, a video player, a handheld communications device, a workstation, a router, an access point, and any combination of these delineated devices, or any other device that communicates via wireless communications with a cell site 114 in order to interact with network 108, which may be a public or a private network.

In some aspects, the user devices 102, 104, and 106 corresponds to a user device or a computing device. For example, the user device may include a display(s), a power source(s) (e.g., a battery), a data store(s), a speaker(s), memory, a buffer(s), a radio(s), and the like. In some implementations, the user devices 102, 104, and 106 comprises a wireless or mobile device with which a wireless telecommunication network(s) may be utilized for communication (e.g., voice and/or data communication). In this regard, the user device may be any mobile computing device that communicates by way of a wireless network, for example, a 3G, 4G, 5G, LTE, CDMA, WiMAX or any other type of network.

In some cases, the user devices 102, 104, and 106 in network environment 100 may optionally utilize network 108 to communicate with other computing devices (e.g., a mobile device(s), a server(s), a personal computer(s), etc.) through cell site 114. The network 108 may be a telecommunications network(s), or a portion thereof. A telecommunications network might include an array of devices or components (e.g., one or more base stations), some of which are not shown. Those devices or components may form network environments similar to what is shown in FIG. 1 and may also perform methods in accordance with the present disclosure. Components such as terminals, links, and nodes (as well as other components) may provide connectivity in various implementations. Network 108 may include multiple networks, as well as being a network of networks, but is shown in more simple form so as to not obscure other aspects of the present disclosure.

Network 108 may be part of a telecommunication network that connects subscribers to their service provider. In aspects, the service provider may be a telecommunications service provider, an internet service provider, or any other similar service provider that provides at least one of voice telecommunications and/or data services to user devices 102, 104, and 106 and any other UEs. For example, network 108 may be associated with a telecommunications provider that provides services (e.g., LTE, 5G) to the user devices 102, 104, and 106. Additionally or alternatively, network 108 may provide voice, SMS, and/or data services to user devices or corresponding users that are registered or subscribed to utilize the services provided by a telecommunications provider. Network 108 may comprise any communication network providing voice, SMS, and/or data service(s), using any one or more wireless communication protocols, such as a 1×circuit voice, a 3G network (e.g., CDMA, CDMA2000, WCDMA, GSM, UMTS), a 4G network (WiMAX, LTE, HSDPA), or a 5G (5G NR) network. The network 108 may also be, in whole or in part, or have characteristics of, a self-optimizing network.

In some implementations, cell site 114 is configured to communicate with the user devices 102, 104, and 106 that are located within the geographical area defined by a transmission range and/or receiving range of the radio antennas of cell site 114. The geographical area may be referred to as the "coverage area" or "coverage footprint" of the cell site or simply the "cell," as used interchangeably hereinafter. Cell site 114 may include one or more base stations, base transmitter stations, radios, antennas, antenna arrays, power amplifiers, transmitters/receivers, digital signal processors, control electronics, GPS equipment, and the like. In particular, cell site 114 may be configured to wirelessly communicate with devices within a defined and limited geographical area. For the purposes of the present disclosure, it may be assumed that it is undesirable and unintended by the network 108 that the cell site 114 provide wireless connectivity to the user devices 102, 104, and 106 when the user devices 102, 104, and 106 are geographically situated outside of the cell associated with the cell site 114.

In an exemplary aspect, the cell site 114 comprises a base station that serves at least one sector of the cell associated with the cell site 114 and at least one transmit antenna for propagating a signal from the base station to one or more of the user devices 102, 104, and 106. In other aspects, the cell site 114 may comprise multiple base stations and/or multiple transmit antennas for each of the one or more base stations, any one or more of which may serve at least a portion of the cell. In some aspects, the cell site 114 may comprise one or more macro cells (providing wireless coverage for users within a large geographic area) or it may be a small cell (providing wireless coverage for users within a small geographic area). For example, macro cells may correspond to a coverage area having a radius of approximately 1-15 miles or more as measured at ground level and extending outward from an antenna at the cell site. In another example, a small cell may correspond to a coverage area having a radius of approximately less than three miles as measured at ground level and extending outward from an antenna at the cell site.

As shown, cell site 114 is in communication with the transmit power controller 112, which comprises various components that are utilized, in various implementations, to perform one or more methods for uplink transmission power adjustment in communication networks, such as on the cell site 114. In aspects, transmit power controller 112 may comprise a receiver 116, a condition analyzer 118, and a power level controller 120. However, in some embodiments, other components than those shown in FIG. 1 may be utilized to carry out aspects of the systems and methods described herein. Each of the components or sub components of the transmit power controller 112 may be a stand-alone or combined processor, server, or other computer processing component that is suitably configured to perform the operations described herein.

In various aspects, the receiver 116 of the transmit power controller 112 is generally responsible for receiving information associated with one or more user devices, e.g., the user devices 102, 104, and/or 106. In aspects, the receiver 116 may receive a message or transmission comprising information associated with one or more user devices. In aspects, the receiver 116 may receive a message or transmission comprising the information associated with one or more user devices may be information that is relevant for configuring one or more base stations and/or user devices for communication with one or more devices. For instance, in certain aspects, the information associated with one or more user devices may be associated with a reference signal used to control and manage downlink channels and/or uplink channels associated with the user devices. The user device can generate one or more uplink reference signals that may include a measurement report indicating various measurements of the device such as one or more signal quality measurements and/or other indications of RF conditions. As an example, references signals may be used to estimate communication signal power, tracking transmitter phase, channel sounding, or any of a number of communication operations. In some aspects, a reference signal may comprise DMRS, PT-RS, CSI-RS, SRS, or a combination thereof. In certain aspects, the information associated with one or more user devices can include signal quality information associated with one or more user devices. Signal quality information may comprise any value, measure, or indication of signal attributes (e.g., power, noise, quality, signal strength). Signal quality information may comprise measurements such as SINR, RSRP, RSRQ, RSSI, or a combination thereof.

In aspects, the condition analyzer 118 utilizes and/or analyzes the information received from the receiver 116 to determine whether that the power level of a user device may need adjustment. For example, the condition analyzer 118 may use RSRP measurements and/or SINR measurements associated with information received by the receiver 116. In at least one example, the condition analyzer 118 may analyze the number of communication ports used by the cell site 114 to communicate with a user device. For example, the condition analyzer 118 may determine that the RF conditions and/or signal quality of transmissions from a user device have decreased and that a mode defining the number of ports may call for the number of ports to be reduced. For example, if RF conditions transition from good to poor, based on the signal quality measurements, the number of ports may be reduced (e.g., from 2 ports to 1 port) as part of a modified mode of operation.

In some embodiments, the condition analyzer 118 may determine that the number of communication layers should be reduced based on RF conditions and/or signal quality. For example, the condition analyzer 118 may detect a diminished RF conditions in relation to a particular user device and may determine that the device should transition from a 2-layer MIMO configuration to a 1-layer protocol. In some embodiments, the condition analyzer 118 may determine that the configuration of a user device should be changed by altering the number of Tx ports and the number of layers, while in at least one other embodiment, either the number of Tx ports or the number of layers may be modified for the user device. For example, a user device experiencing moderate RF conditions may operate according to a Tx diversity protocol in which 2 ports transmit the same communication data over a single layer.

In aspects, once the condition Analyzer 118 has determined that the information received by the receiver 116 indicates that the transmit power of a user device should be adjusted, the power level controller 120 may assign a target transmit power in association with the device. The target transmit power may comprise any of a number of values or configurations for facilitating uplink transmit power modifications and/or operations. For example, the target transmit power may define a particular power level that a user device should transmit at (e.g., 26 dBm). In at least one embodiment, the target transmit power may define a maximum allowable power value that a user device may operate at. In at least one embodiment, the target transmit power may comprise a range of uplink transmit power values for which a user device may operate using a transmit power value within the range. For example, the target transmit power may indicated that a device should operate within a range of 20 dBm to 26 dBm.

In some aspects, once the power level controller 120 assigns a target transmit power in association with a user device, the target transmit power and associated information may be transmitted to the user device by the base station of the cell site 114. For example, a base station of the cell site 114 may transmit a message to a user device, such as UE devices 102, 104, and 106 that may comprise information indicating the target transmit power value. In some embodiments, the user device may receive transmissions in accordance with the particular transmit power operations determined by the power level controller 120.

Although in some embodiments, information relating to the adjustment of uplink transmit power may be transmitted to a user device, in the same or other aspects, the power level controller 120 may be used by the cell site 114 to facilitate transmission operations with one or more user devices such as UE devices 102, 104, and 106.

Figure 2:
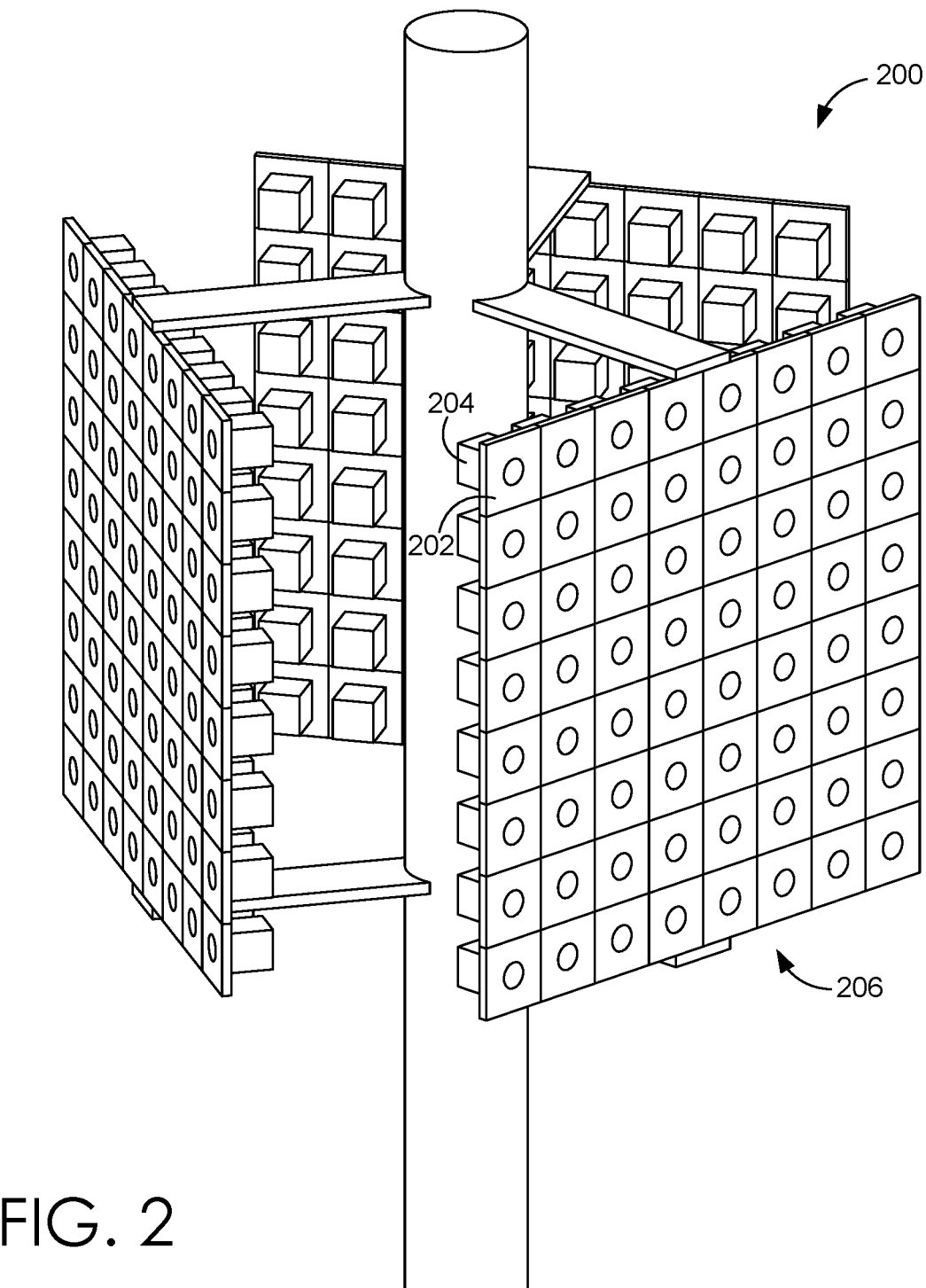
FIG. 2 depicts an example base station configuration, in accordance with embodiments of the present disclosure.

FIG. 2 depicts an example base station configuration suitable for use in implementing embodiments of the present disclosure and is designated generally as base station 200. Base station 200 is but one example of a suitable configuration and is not intended to suggest any limitations as to the scope of use or functionality of embodiments described herein. Neither should the configuration be interpreted as having any dependency or requirement relating to any one or combination of components illustrated.

Base station 200 comprises at least a first antenna array 206, the first antenna array 206 having one or more antenna elements 202. In aspects, the one or more antennas 202 may be dipole antennas, having a length, for example, of ¼, ½, 1, 1 ½, or any desired wavelength. In aspects, the antenna array 206 may be an active antenna array, FD-MIMO, massive MIMO, 3G, 4G, 5G, and/or 802.11. While we refer to dipole antennas herein, in other aspects, the antenna may be monopole, loop, parabolic, traveling-wave, aperture, yagi-uda, conical spiral, helical, conical, radomes, horn, and/or apertures, or any combination thereof. It is noted that adjusting one or more individual power supplies to antennas of an antenna array may be broadly applicable to an antenna array comprising any type of antenna targeting any portion of the RF spectrum (though any lower than VHF may be size prohibitive). In one aspect, the antenna may be configured to communicate in the UHF and/or SHF spectrum, for example, in the range of 1.3 GHz-30 GHz.

By way of a non-limiting example, the antenna array 206 may comprise antenna elements 202 arranged in a structure or grid. Although, the arrangement of the antenna elements 202 is depicted as a grid structure herein, the arrangement of the antenna elements 202 may have any of a number of structures, multi-planar positions, and vertical and/or horizontal arrangements. Each antenna element 202 of the antenna array 206 may comprise a dedicated power supply 204. The power supply 204 supplies power having a certain phase and amplitude to a respective antenna element 202. In an aspect, the power supply comprises a power amplifier. In various aspects, the power supply, e.g., the power supply 204, may additionally comprise a processor for controlling or adjusting the power supply to the respective antenna element 202.

In aspects, the base station 200 may further comprise a processor 212. In such aspects, the processor 212 may be any one or more convenient processors, servers, computer processing components, or the like, that can be configured to perform any one or more operations of the proactive transmit power controller 112 of FIG. 1. In some aspects, the processor 212 may be communicatively coupled to each antenna element 202. In aspects, as discussed above with respect to the transmit power controller 112 of FIG. 1, the processor 212 of FIG. 2 may execute all or a part of the actions for adjusting the transmit power for one or more devices based on information associated with the one or more devices. For example, the processor 212 may facilitate in transmitting a transmit power control command ("TPC") to one or more user devices that may instruct the devices to adjust their uplink transmit power.

Figure 3:
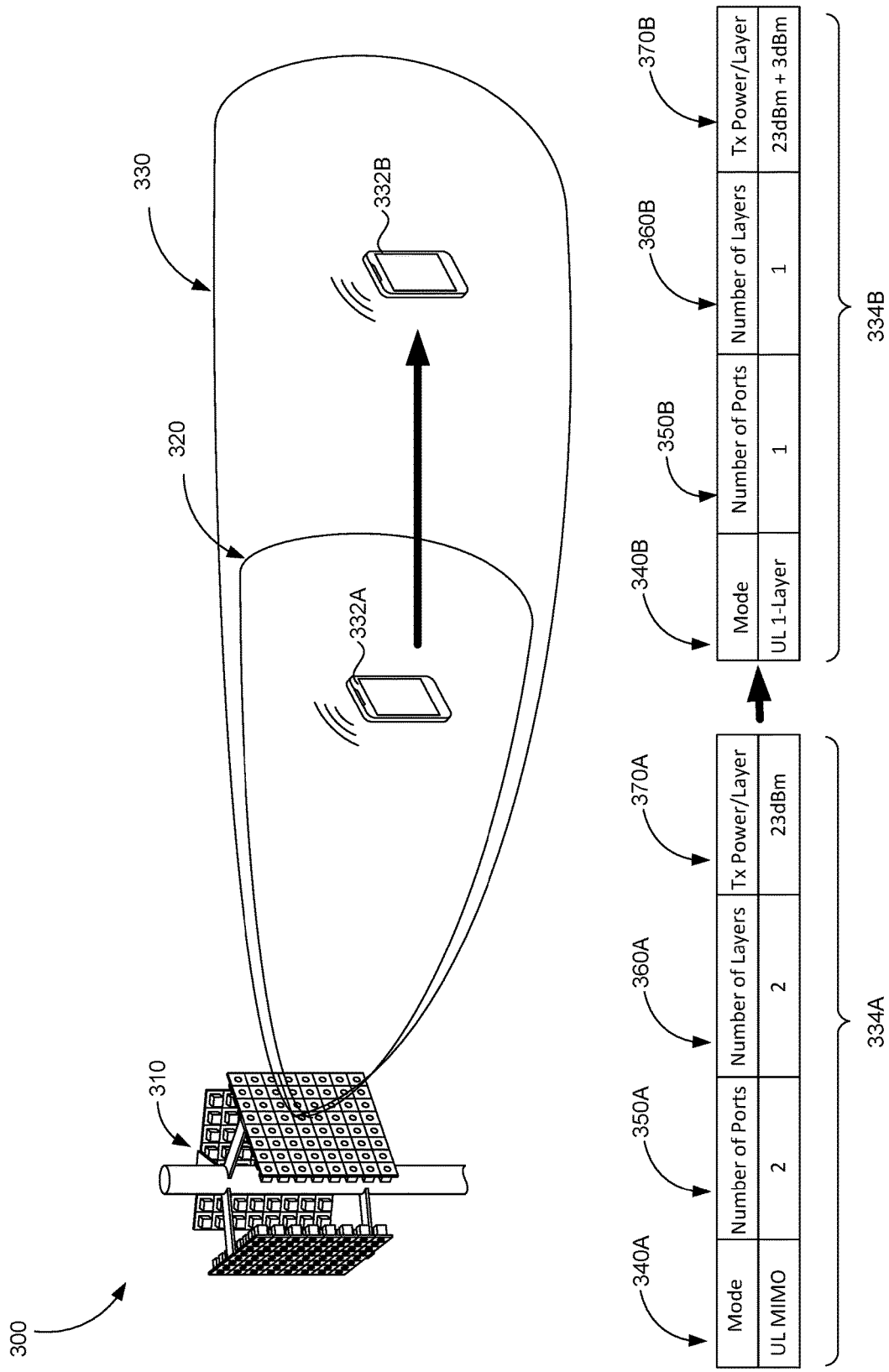
FIG. 3 depicts an example system for transmit power correction, in accordance with implementation of the present disclosure.

FIG. 3 depicts a system 300, for transmit power correction, in accordance with implementation of the present disclosure. In aspects, the base station 310 can include any or all of the properties and parameters of the base station 200 described above with reference to FIG. 2 and/or the network environment 100, including the cell site 114, described above with reference to FIG. 1. In the aspect depicted in FIG. 3, the base station 310 is communicating with a UE 332.

In aspects, as discussed above, the systems and methods disclosed herein may receive information associated with one or more UEs to identify conditions which may require uplink power adjustment for the one or more UEs. As further discussed above, in aspects, the information associated with one or more UEs may indicate a configuration and/or signal quality measurement or other data associated with the one or more UEs. In some aspects, the information associated with one or more UEs may indicate a data rate, a data buffer size, data buffer status, SINR, number of ports, number of layers, modulation parameters, transmission waveform, and/or any of a number of measurements, configurations, or parameters associated with communication data for the one or more UEs. For instance, in one example scenario, the UE 332A may be initially located at a first position relative to the antenna array base station 310 at a first time. For example, the first position may be located within a first RF coverage footprint 320. The first RF coverage footprint 320 may be associated with a particular communication protocol, and/or operating mode. For example, the first RF coverage footprint 320 may correspond to the range in which a 2-layer MIMO uplink protocol is practical for the UE 332A. For example, the UE 332A may be configured to operate in a UL MIMO mode as shown in the mode 340A of configuration table 334A. In such an example, the UE 332A may be communicating using 2 ports, two layers, and at a maximum Tx power of 23 dBm as shown in the number of ports 350A, the number of layers 360A and the Tx power per layer 370A of configuration table 334A. In such aspects, the information associated with the UE 332A may be a measurement indicating signal quality, such as RSRP. The base station 310 may store the information associated with the UE in a database such as the database 110 of FIG. 1.

In some aspects, the UE 33A may be moved to be located at a second position and/or situation relative to the antenna array 320 at a second time. The UE 332B at the second position may be located within a second RF coverage footprint 330 having different RF conditions and/or characteristics from the first RF coverage footprint 320. The second RF coverage footprint may be associated with a particular communication protocol based on the RF conditions. For example, the second RF coverage footprint 330 may correspond an area or position that may experience diminished RF conditions compared to the first RF coverage footprint 320. In some embodiments, portions of a RF coverage footprint, such as portions of the second RF coverage footprint 330, may overlap with at least a portion of one or more other RF coverage footprints, such as portions of the first RF coverage footprint 320. In such aspects, based on the information associated with the UE 332B at the second position, comprising signal quality information, the one or more antenna elements of the base station 310 and/or UE 332B may be re-configured according to a second configuration, such as the configuration depicted in configuration table 334B. The information associated with the UE 322B may indicate a decreased signal quality compared to the measurement of signal quality at the first position. For instance, the base station 310 may compare the information associated with the UE 322B at the second position to the information from the UE 332A at the first position that may have been stored in a database, to determine if the UE 332B should be re-configured to operate on a second configuration. In some embodiments, this determination may be based on a predetermined threshold value associated with signal quality information or may be based on a comparison to other measurements of signal quality. In such aspects, at the first time, the UE 332A may be configured to a first configuration, while at a second time, the UE 332B may be configured to a second configuration. For example, the UE 332B may transition from the configuration described in configuration table 334A to the configuration described in configuration table 334B. In such an example the UE 332B may be configured to reduce the number of ports 350B from 2 to 1, the number of layers 360B from 2 to 1. In some embodiments, when the number of layers is reduced from 2 to 1—each of the two layers operating with a transmit power of 23 dBm, for a total of 26 dBm—the resulting single layer may continue to operate with a transmit power of 23 dBm that may be below the target transmit power of the UE 332B (e.g., 26 dBm for a High Power User Equipment operating at Power Class 2). In such an embodiment, the UE 332B may increase the transmit power to satisfy the target transmit power (e.g., increasing Tx power by +3 dBm). In some embodiments, the UE 332B may determine the amount of power to increase the transmit power, while in the same or different embodiments, the UE 332B may receive commands, or otherwise be instructed, to increase its transmit power and/or the amount of power to increase. For example, the UE 332B may receive commands (e.g., TPC) from the base station 310 instructing the UE 332B to adjust it's transmit power.

Figure 4:
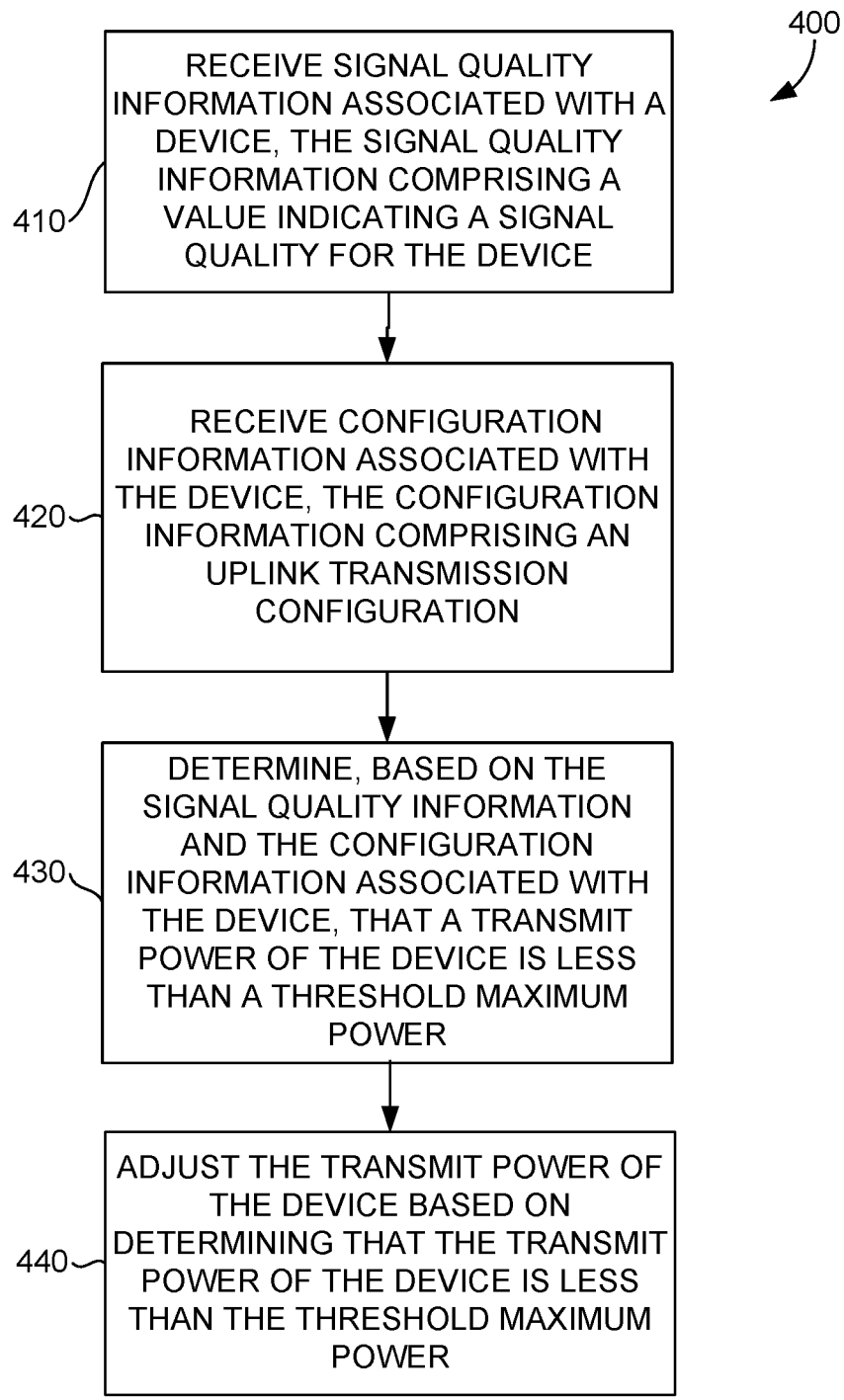
FIG. 4 depicts a flow chart of a method for uplink power adjustment in communication systems, in accordance with aspects of the present disclosure.
Figure 5:
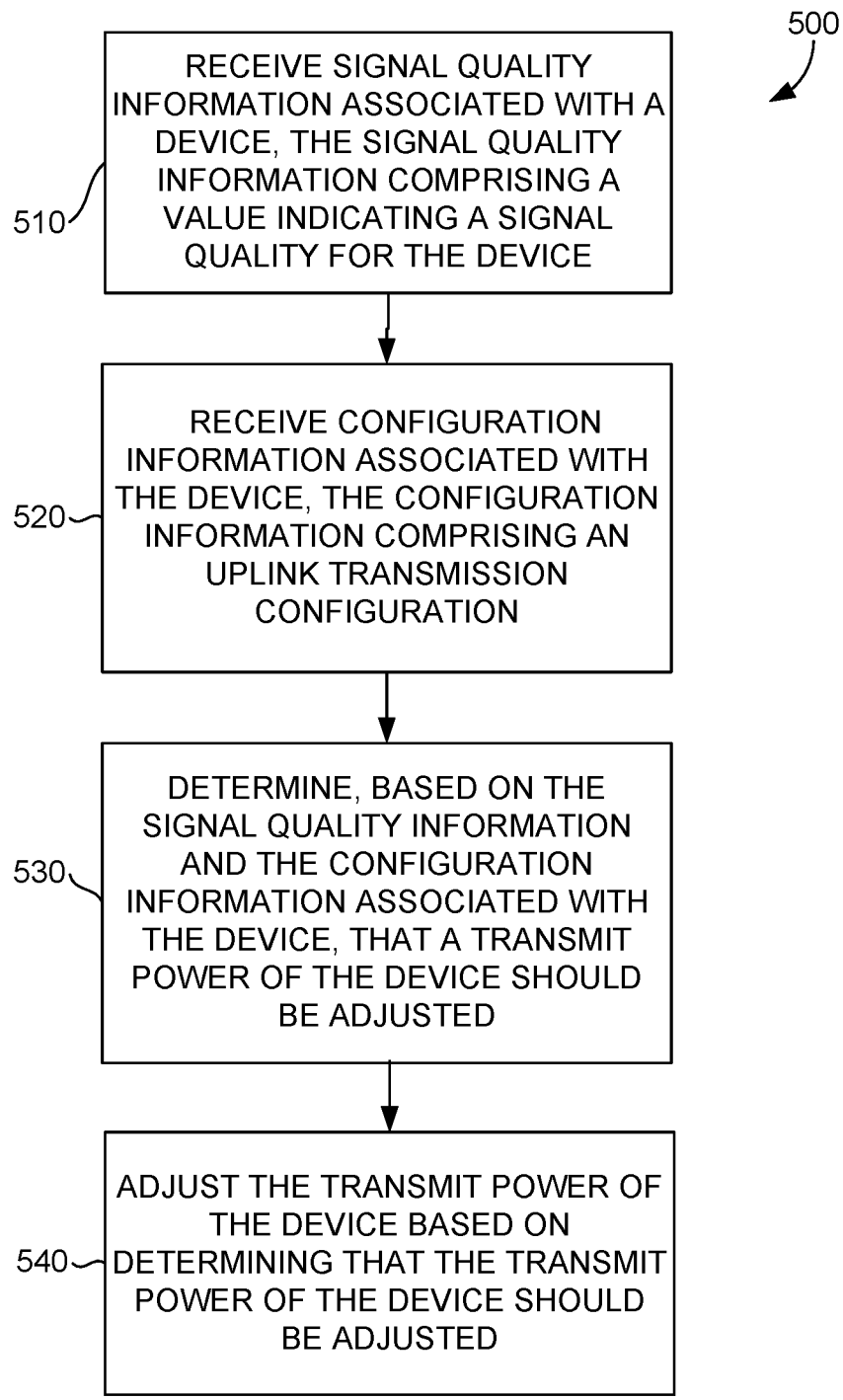
FIG. 5 depicts a flow chart of a method for uplink power adjustment in communication systems, in accordance with aspects of the present disclosure.
Figure 6:
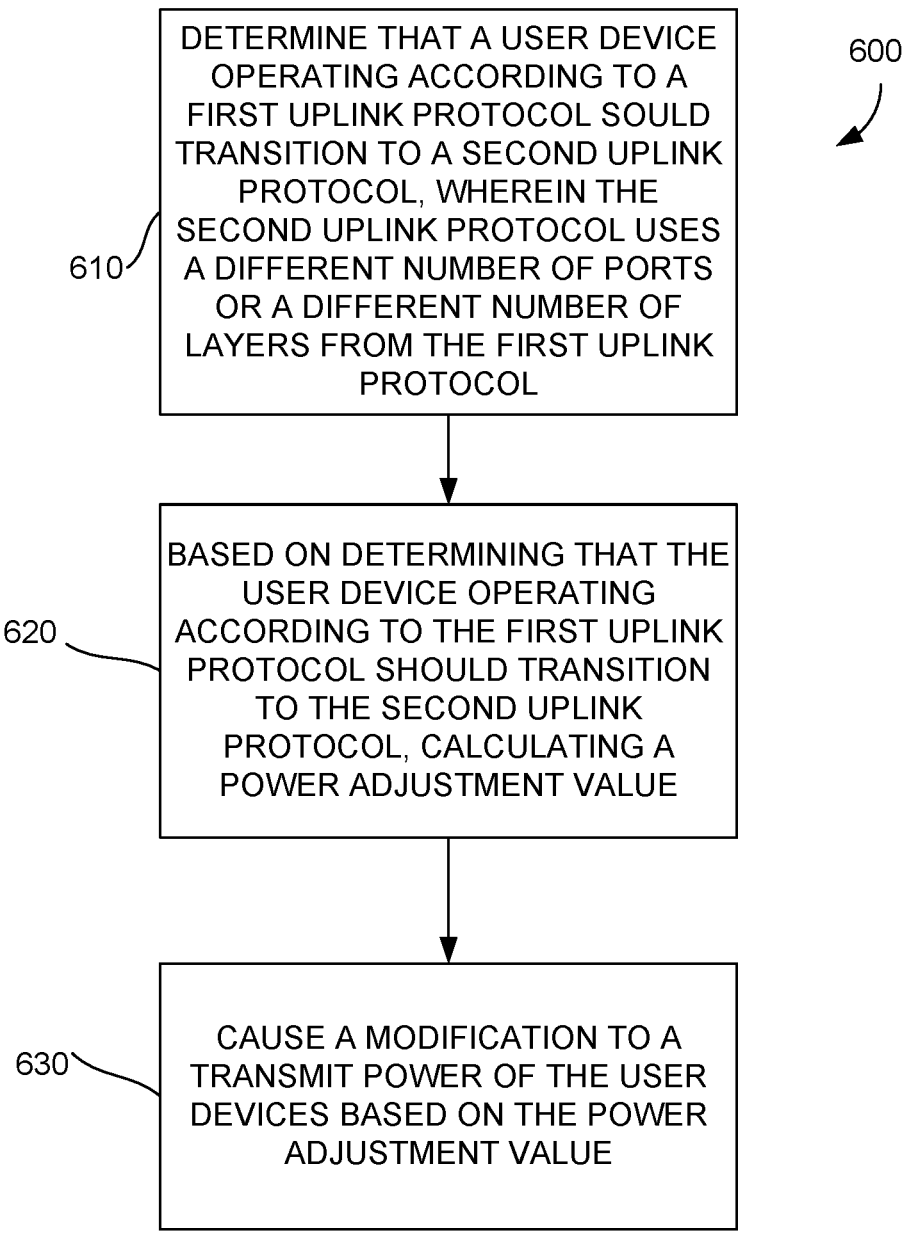
FIG. 6 depicts a flow chart of a method for uplink power adjustment in communication systems, in accordance with aspects of the present disclosure.

Now referring to FIGS. 4-6, each block of methods 400, 500, and 600, described herein, comprises a computing process that may be performed using any combination of hardware, firmware, and/or software. For instance, various functions may be carried out by a processor executing instructions stored in memory. The methods 400, 500, and 600 may also be embodied as computer-usable instructions stored on computer storage media. The methods 400, 500, and 600 may be provided by a standalone application, a service or hosted service (standalone or in combination with another hosted service), or a plug-in to another product, to name a few. In addition, the methods 400, 500, and 600 are described, by way of example, with respect to the system of FIG. 1. However, these methods may additionally or alternatively be executed by any one system, or any combination of systems, including, but not limited to, those described herein.

FIG. 4 is a flow chart illustrating an example method 400 for uplink power adjustment in communication systems, in accordance with aspects of the present disclosure. It should be understood that while FIG. 4 depicts just one particular arrangement and/or order of steps, other arrangements and/or orders of steps are possible and contemplated by the disclosed herein. For instance, one or more of the steps depicted in FIG. 4, may be performed in a different order or otherwise omitted.

At step 410 of the method 400, signal quality information may be received, for example, by the receiver 116 of FIG. 1. For example, The receiver 116 may receive signal quality information, from one or more UE(s) 102, 104, or 106. For instance, a user device may transmit, over the network 108, a SINR value and/or RSRP value that is received with the receiver 116.

At step 420 of method 400, configuration information may be received, for example, by the receiver 116 of FIG. 1. For example, The receiver 116 may receive configuration information, from one or more UE(s) 102, 104, or 106. For instance, a user device may transmit, over the network 108, an indication of a particular operating mode that is received with the receiver 116. In at least one embodiment, the configuration information may include an indication of a number of antennae ports and/or layers used by the user device for uplink transmissions.

At step 430 of the method 400, it may be determined that a transmit power of the device is less than a threshold maximum power. In some embodiments, the threshold maximum power may be based on a power class associated with a device. In at least one embodiment the threshold maximum power may be based on the signal quality information and the configuration information associated with a device. For example, the configuration information may indicate that the user device is using one layer and one port for uplink communications. In such an example, it may be determined that the user device is operating at 23 dBm instead of the maximum threshold of 26 dBm.

At step 440 of method 400, the transmit power of the device may be adjusted based on determining that the transmit power of the device is less than the threshold maximum power. For example, the power level controller 120 of FIG. 1 may instruct the device to alter the power level used for uplink transmissions.

FIG. 5 is a flow chart illustrating an example method 500 for uplink power adjustment in communication systems, in accordance with aspects of the present disclosure. It should be understood that while FIG. 5 depicts just one particular arrangement and/or order of steps, other arrangements and/or orders of steps are possible and contemplated by the disclosed herein. For instance, one or more of the steps depicted in FIG. 5, may be performed in a different order or otherwise omitted.

At step 510 of the method 500, signal quality information may be received, for example, by the receiver 116 of FIG. 1. For example, The receiver 116 may receive signal quality information, from one or more UE(s) 102, 104, or 106. For instance, a user device may transmit, over the network 108, a SINR value and/or RSRP value that is received with the receiver 116.

At step 520 of method 500, configuration information may be received, for example, by the receiver 116 of FIG. 1. For example, The receiver 116 may receive configuration information, from one or more UE(s) 102, 104, or 106. For instance, a user device may transmit, over the network 108, an indication of a particular operating mode that is received with the receiver 116. In at least one embodiment, the configuration information may include an indication of a number of antennae ports and/or layers used by the user device for uplink transmissions.

At step 530 of the method 500, it may be determined that a transmit power of the device should be adjusted. In some embodiments, determining that the transmit power should be adjusted may be based on a power class associated with a device. In at least one embodiment, determining that the transmit power should be adjusted may be based on the signal quality information and the configuration information associated with a device. For example, the configuration information may indicate that the user device is using one layer and one port for uplink communications. In such an example, it may be determined that the user device should be adjusted to a maximum of 26 dBm.

At step 540 of method 500, the transmit power of the device may be adjusted based on determining that the transmit power of the device should be adjusted. For example, the power level controller 120 of FIG. 1 may instruct the device to alter the power level used for uplink transmissions.

FIG. 6 is a flow chart illustrating an example method 600 for uplink power adjustment in communication systems, in accordance with aspects of the present disclosure. It should be understood that while FIG. 6 depicts just one particular arrangement and/or order of steps, other arrangements and/or orders of steps are possible and contemplated by the disclosed herein. For instance, one or more of the steps depicted in FIG. 6, may be performed in a different order or otherwise omitted.

In step 610 of method 600, it may be determined that a user device that is operating according to a first uplink protocol should transition to a second uplink protocol. In some embodiments, the second uplink protocol uses a different number of ports or a different number of layers from the first uplink protocol. For example, the first uplink protocol may include a 2-layer, 2-port configuration while the second uplink protocol may include a 1-layer, 1-port configuration.

At step 620 of method 600, a power adjustment value may be calculated. In some embodiments, calculating the power adjustment value may be based on determining that the user device that is operating according to a first uplink protocol should transition to a second uplink protocol. For example, a power adjustment value of +3 dBm may be calculated based on the first and second uplink protocols.

At step 630 of method 600, the transmit power of the user device may be modified. For example, the power level controller 120 of FIG. 1 may instruct the user device to cause it to modify the transmit power being used for uplink communication. In some embodiments, the transmit power of the user device may be modified in accordance to the calculated power adjustment value.

Figure 7:
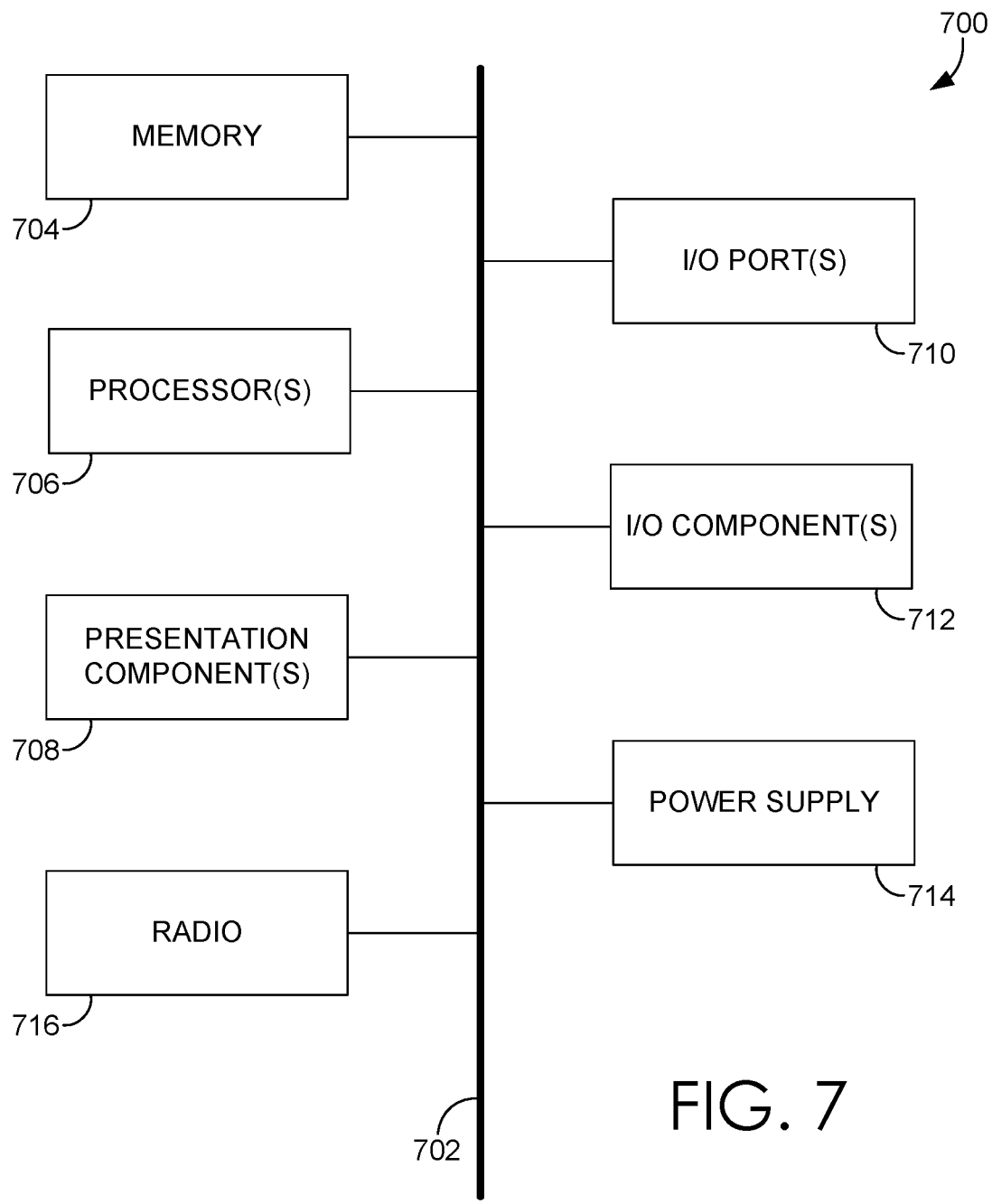
FIG. 7 depicts a diagram of an exemplary computing environment suitable for use in implementations of the present disclosure.

Referring now to FIG. 7, a diagram is depicted of an exemplary computing environment suitable for use in implementations of the present disclosure. In particular, the exemplary computer environment is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 7, computing device 700 includes bus 702 that directly or indirectly couples the following devices: memory 8704, one or more processors 706, one or more presentation components 708, input/output (I/O) ports 710, I/O components 712, power supply 714 and radio(s) 716. Bus 702 represents what may be one or more busses (such as an address bus, data bus, or combination thereof). Although the devices of FIG. 7 are shown with lines for the sake of clarity, in reality, delineating various components is not so clear, and metaphorically, the lines would more accurately be grey and fuzzy. For example, one may consider a presentation component, such as a display device to be one of I/O components 712. Also, processors, such as one or more processors 706, have memory. The present disclosure hereof recognizes that such is the nature of the art, and reiterates that FIG. 7 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 7 and refer to "computer" or "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data.

Computer storage media includes RAM, ROM, EEPROM, flash memory or other memory technology, CD-ROM, DVD or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal, such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media such as acoustic, RF, infrared, and other wireless media. Combinations of any of the above should also be included within the scope of computer-readable media.

Memory 704 includes computer-storage media in the form of volatile and/or nonvolatile memory. Memory 704 may be removable, non-removable, or a combination thereof. Exemplary memory includes solid-state memory, hard drives, optical-disc drives, etc. Computing device 700 includes one or more processors 706 that read data from various entities, such as bus 702, memory 704, or I/O components 712. One or more presentation components 708 presents data indications to a person or other device. Exemplary one or more presentation components 708 include a display device, speaker, printing component, vibrating component, etc. I/O ports 710 allow computing device 700 to be logically coupled to other devices, including I/O components 712, some of which may be built in computing device 700. Illustrative I/O components 712 include a microphone, joystick, game pad, satellite dish, scanner, printer, wireless device, etc.

Radio(s) 716 represents a radio that facilitates communication with a wireless telecommunications network. Illustrative wireless telecommunications technologies include CDMA, GPRS, TDMA, GSM, and the like. Radio 716 might additionally or alternatively facilitate other types of wireless communications including Wi-Fi, WiMAX, LTE, or other VoIP communications. As can be appreciated, in various embodiments, radio 716 can be configured to support multiple technologies and/or multiple radios can be utilized to support multiple technologies. A wireless telecommunications network might include an array of devices, which are not shown so as to not obscure more relevant aspects of the invention. Components, such as a base station, a communications tower, or even access points (as well as other components), can provide wireless connectivity in some embodiments.

Many different arrangements of the various components depicted, as well as components not shown, are possible without departing from the scope of the claims below. Embodiments of this technology have been described with the intent to be illustrative rather than be restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A method for assigning a transmit power level to a device, the method comprising:
    receiving, via a transmit power controller associated with a cell site, signal quality information associated with a device, the signal quality information comprising a value indicating a signal quality for the device;
    receiving, via the transmit power controller, configuration information associated with the device, the configuration information comprising an uplink transmission configuration;
    determining, via the transmit power controller, that a number of uplink transmission layers has decreased;
    determining, via the transmit power controller and based on the signal quality information and the configuration information associated with the device, that a transmit power of the device is less than a threshold maximum power; and
    causing, via the transmit power controller, the device to increase the transmit power based on determining that the transmit power of the device is less than the threshold maximum power and based on determining that the number of uplink transmission layers has decreased.

2. The method of claim 1, wherein the configuration information associated with the device includes a number of ports and a number of layers used for transmission.

3. The method of claim 1, wherein the signal quality information includes a SINR measurement.

4. The method of claim 1, wherein the signal quality information includes an RSRP signal.

5. The method of claim 1, further comprising transmitting an instruction to the device indicating to transmit a set of data via two transmit ports over a single layer based on the signal quality information being below a threshold and based on determining that the number of uplink transmission layers has decreased.

6. The method of claim 5, wherein the transmit power is to increase to 26 dBm.

7. The method of claim 1, wherein the threshold maximum power is determined based on a defined power class.

8. The method of claim 1, wherein the number of uplink transmission layers has decreased from two layers to one layer.

9. A system comprising:
    one or more processors; and
    one or more computer storage hardware devices storing computer-usable instructions that, when used by the one or more processors, cause the one or more processors to:
        receive signal quality information associated with a device, the signal quality information comprising a value indicating a signal quality for the device;
        receive configuration information associated with the device, the configuration information comprising an uplink transmission configuration;
        determine that the device is to transition to a protocol having a lower number of uplink transmission layers based on the signal quality information;
        determine, based on the signal quality information and the configuration information associated with the device, that a total transmit power of the device should be adjusted; and
        cause the total transmit power of the device to be increased based on determining that the total transmit power of the device should be adjusted.

10. The system of claim 9, wherein the configuration information associated with the device includes a number of ports and a number of layers used for transmission.

11. The system of claim 9, wherein the signal quality information includes a SINR measurement.

12. The system of claim 9, wherein the signal quality information includes an RSRP measurement.

13. The system of claim 9, wherein causing the total transmit power of the device to be increased involves transmitting an instruction to the device indicating to increase transmit power by 3 dBm.

14. The system of claim 9, wherein causing the total transmit power of the device to be increased includes transmitting an instruction to the device that indicates the total transmit power is 26 dBm.

15. One or more computer storage media having computer-executable instructions embodied thereon, that when executed by at least one processor, cause the at least one processor to perform a method comprising:
    receiving signal quality information associated with a device;
    receiving an uplink transmission configuration for the device;
    determining that a number of uplink transmission layers has decreased;
    determining, based on the signal quality information and the uplink configuration associated with the device, that a transmit power of the device is less than a threshold maximum power; and
    causing the device to increase the transmit power based on determining that the transmit power of the device is less than the threshold maximum power and based on determining that the number of uplink transmission layers has decreased.

16. The one or more computer storage media of claim 15, wherein the uplink configuration includes an indication of a number of antenna ports and layers used by the device for uplink transmissions, and wherein the device is caused to increase the transmit power based on the number of antenna ports and layers.

17. The one or more computer storage media of claim 16, further comprising:
   determining that the uplink transmission configuration for the device includes a 2-layer MIMO protocol; and
   based on determining that the transmit power of the device is less than the threshold maximum power, that the number of uplink transmission layers has decreased, and that the uplink transmission configuration includes the 2-layer MIMO protocol, causing the device to transition to a one layer uplink transmission configuration.

18. The one or more computer storage media of claim 16, further comprising causing the device to utilize at least one less transmit port for the uplink transmissions based on determining that the number of uplink transmission layers has decreased.

19. The one or more computer storage media of claim 15, wherein causing the device to increase the transmit power includes transmitting a range of transmit power values for the device to increase to.

20. The one or more computer storage media of claim 15, wherein causing the device to increase the transmit power includes transmitting a transmit power value of an amount by which the device to increase the transmit power by.

\* \* \* \* \*